United States Patent
Suzuki et al.

(10) Patent No.: US 6,552,871 B2
(45) Date of Patent: *Apr. 22, 2003

(54) HARD DISK DRIVE HEAD-MEDIA SYSTEM HAVING REDUCED STICTION AND LOW FLY HEIGHT

(75) Inventors: Shoji Suzuki, San Jose, CA (US); Ta-Chang Fu, San Jose, CA (US)

(73) Assignee: Komag, Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/055,433

(22) Filed: Jan. 22, 2002

(65) Prior Publication Data

US 2002/0097521 A1 Jul. 25, 2002

Related U.S. Application Data

(63) Continuation of application No. 09/082,789, filed on May 21, 1998, now Pat. No. 6,381,090.

(51) Int. Cl.[7] .................. G11B 5/60; G11B 21/21; G11B 5/82
(52) U.S. Cl. .............. 360/97.01; 360/135; 360/235.8; 360/236.6
(58) Field of Search ............... 360/97.01, 135, 360/235.8, 236.6, 234.3, 235.4

(56) References Cited

U.S. PATENT DOCUMENTS

| | | |
|---|---|---|
| 3,754,104 A | 8/1973 | Piper et al. |
| 4,034,412 A | 7/1977 | Smith |
| 4,327,387 A | 4/1982 | Plotto |
| 4,692,832 A | 9/1987 | Bandara et al. |
| 4,757,402 A | 7/1988 | Mo |
| 4,853,810 A | 8/1989 | Pohl et al. |
| 4,893,204 A | 1/1990 | Yamada et al. |
| 4,901,185 A | 2/1990 | Kubo et al. |
| 5,010,429 A * | 4/1991 | Taguchi et al. .......... 360/236.6 |
| 5,012,572 A | 5/1991 | Matsuzawa et al. |

(List continued on next page.)

FOREIGN PATENT DOCUMENTS

| | | |
|---|---|---|
| EP | 0442660 A2 | 8/1991 |
| JP | 54-23517 | 2/1979 |
| JP | 56-107363 | 8/1981 |
| JP | 58-66995 | 4/1983 |
| JP | 59-193580 | 11/1984 |

(List continued on next page.)

OTHER PUBLICATIONS

Yamamoto et al., "Stiction free sliders . . . ", IEEE Trans. Mag., vol. 34, No. 4, 1998.*
Wahl and Talke, "Numerical Stimulation . . . ", IEEE Trans. Mag., vol. 30, No. 6, pp 4122–4124 (Nov. 1994).*
Waschenschwanz et al., "The special needs . . . ", Insight, vol. XI, No. 1, pp 1, 11, 13, (Jan./Feb. 1998).*
"Fujitsu's Padded Slider Holds Stiction at Bay", Data Storage, p. 8 (May 1998).*
Lee et al. "Effect of Disk . . . ", IEEE Trans. Mag., vol. 28, No. 5, pp. 2880–2882 (Sep. 1992).*

(List continued on next page.)

Primary Examiner—David L. Ometz
(74) Attorney, Agent, or Firm—Blakely, Sokoloff, Taylor & Zafman LLP

(57) ABSTRACT

A disk drive system including a disk having a contact surface and a slider having a surface with a pattern of features is described. The disk's contact surface is textured with protrusions that roughen surface. The distance between the protrusions on the disk is less than the distance between the features on the slider surface.

11 Claims, 14 Drawing Sheets

U.S. PATENT DOCUMENTS

| | | |
|---|---|---|
| 5,020,213 A | 6/1991 | Aronoff et al. |
| 5,034,828 A | 7/1991 | Ananth et al. |
| 5,052,099 A | 10/1991 | Taguchi et al. |
| 5,063,712 A | 11/1991 | Hamilton et al. |
| 5,067,037 A | 11/1991 | Ananth et al. |
| 5,079,657 A * | 1/1992 | Aronoff et al. ......... 360/236.6 |
| 5,108,781 A * | 4/1992 | Ranjan et al. ............. 427/128 |
| 5,162,073 A | 11/1992 | Aronoff et al. |
| 5,200,867 A | 4/1993 | Albrecht et al. |
| 5,202,803 A | 4/1993 | Albrecht et al. |
| 5,267,104 A | 11/1993 | Albrecht et al. |
| 5,278,711 A | 1/1994 | Gregory et al. |
| 5,282,337 A | 2/1994 | Duhame et al. |
| 5,323,282 A | 6/1994 | Kanai et al. |
| 5,345,353 A | 9/1994 | Krantz et al. |
| 5,374,463 A | 12/1994 | Bethune et al. |
| 5,386,666 A | 2/1995 | Cole |
| 5,388,020 A | 2/1995 | Nakamura et al. |
| 5,396,386 A | 3/1995 | Bolasna et al. |
| 5,396,387 A | 3/1995 | Murray |
| 5,418,667 A * | 5/1995 | Best et al. .................. 360/237 |
| 5,420,735 A | 5/1995 | Haines |
| 5,424,888 A | 6/1995 | Hendriks et al. |
| 5,490,027 A | 2/1996 | Hamilton et al. |
| 5,499,149 A | 3/1996 | Dovek |
| 5,508,861 A | 4/1996 | Ananth et al. |
| 5,515,219 A | 5/1996 | Ihrke et al. |
| 5,526,204 A | 6/1996 | French et al. |
| 5,537,273 A | 7/1996 | Hendriks et al. |
| 5,550,691 A | 8/1996 | Hamilton |
| 5,550,693 A | 8/1996 | Hendriks et al. |
| 5,550,696 A | 8/1996 | Nguyen |
| 5,557,488 A | 9/1996 | Hamilton et al. |
| 5,569,506 A | 10/1996 | Jahnes et al. |
| 5,572,386 A | 11/1996 | Ananth et al. |
| 5,606,476 A | 2/1997 | Chang et al. |
| 5,612,838 A | 3/1997 | Smith et al. |
| 5,625,512 A | 4/1997 | Smith |
| 5,626,941 A | 5/1997 | Ouano |
| 5,673,156 A * | 9/1997 | Chen et al. ............... 360/236.6 |
| 5,768,055 A | 6/1998 | Tian et al. |
| 5,774,303 A * | 6/1998 | Teng et al. ............... 360/235.2 |
| 5,808,380 A | 9/1998 | Seith |
| 5,815,346 A * | 9/1998 | Kimmal et al. .......... 360/236.6 |
| 5,841,608 A | 11/1998 | Kasamatsu et al. |
| 5,864,452 A | 1/1999 | Hirano et al. |
| 5,870,250 A | 2/1999 | Bolasna et al. |
| 5,870,251 A | 2/1999 | Boutaghou |
| 5,872,686 A | 2/1999 | Dorius et al. |
| 5,886,856 A | 3/1999 | Tokuyama et al. |
| 5,949,612 A | 9/1999 | Gudenman et al. |
| 5,991,118 A | 11/1999 | Kasamatsu et al. |
| 5,994,035 A | 11/1999 | Tsukamoto et al. |
| 6,040,958 A | 3/2000 | Yamamoto et al. |
| 6,381,090 B1 * | 4/2002 | Suzuki et al. ............ 360/97.01 |
| 6,459,547 B1 | 10/2002 | Riddering et al. |

FOREIGN PATENT DOCUMENTS

| | | | |
|---|---|---|---|
| JP | 4-245054 | 9/1992 | |
| JP | 5-307748 | * 11/1993 | ................. 360/135 |
| JP | 6-12807 | * 1/1994 | ................. 360/103 |
| JP | 6-111294 | * 4/1994 | |
| JP | 7-6538 | * 1/1995 | |
| JP | 08-069674 | 3/1996 | |
| JP | 08-212740 | 8/1996 | |
| JP | 8-279132 | 10/1996 | |
| JP | 08-287440 | 11/1996 | |

OTHER PUBLICATIONS

Marchon et al. "Significance of Surface . . . ", Tribology and Mechanics of Magnetic Storage Systems VI, ASLE SP–26, pp. 71–80, (1990).*

Ashar, Magnetic Disk Drive Technology, IEEE, Inc., 1997, Chapter 10, pp. 268–305.*

Ashar, K., *Magnetic Disk Drive Technology*, Institute of Electrical and Electronics Engineers, Inc., 1997, Chapter 10, pp. 268–305.

Yamamoto et al., "Stiction Free Slider for Lightly Textured Disks", IEEE Trans. Mag. vol. 34, No. 4, 1998.

Wahl and Talke, "Numerical Simulation of the Steady State Flying Characteristics of a 50% Slider with Surface Texture", IEEE Trans. Mag. vol. 30, No. 6, pp. 4122–4124 (Nov. 1994).

Wachenschwanz et al., "The Special Needs of Server–Class Disks", Insight, vol. XI, No. 1, pp. 1, 11, 13, (Jan./Feb. 1998).

"Fujitsu's Padded Slider Holds Stiction at Bay", Data Storage, p. 8 (May 1998).

Lee et al., "Effect of Disk Cross Hatch Texture on Tribological Performance", IEEE Trans. Mag. vol. 28, No. 5, pp. 2880–2882 (Sep. 1992).

Marchon et al., "Significance of Surface roughness Measurements. Application to the Tribology of the Head/Disk Interface", Tribology and Mechanics of Magnetic Storage Systems VI, ASLE SP–26, pp. 71–80 (1990).

Kraut, George P., "Statics and Strength of Materials", p. 42, 1984, ISBN 0–8359–7112–0.

Technical Disclosure Bulletin, "Magnetic Disk Storage System With Structured Magnetic Head Slider", by IBM Corp., vol. 27, No. 10A, (Mar. 1985) pp. 5820–5821.

"Stiction Free Slider for the Smooth Surface Disk", by Y. Kasamatsu et al., IEEE Transactions on Magnetics, vol. 31, No. 6, (Nov. 1995), pp. 2961–1963.

"A Stiction Model for a Head–Disk Interface of a Rigid Disk Drive", by J. Gui et al., J. Appl. Phys., vol. 8, No. 6, (Sep. 15, 1995), pp. 4206–4217.

"A Model for Mechanical Seals with Regular Microsurface Structure", by I. Etsion et al., Tribology Transactions, vol. 39, (1996), pp. 677–683.

"Increasing Mechanical Seals Life With Laser–Textured Seal Faces", by G. Halperin et al., Surface Surtech Technologies Ltd., (Sep. 1997), pp. 1–12.

* cited by examiner

HARD DISK DRIVE HEAD-MEDIA SYSTEM HAVING REDUCED STICTION AND LOW FLY HEIGHT

This application is a continuation application of U.S. patent application Ser. No. 09/082,789 entitled "HARD DISK DRIVE HEAD-MEDIA SYSTEM HAVING REDUCED STICTION AND LOW FLY HEIGHT" filed on May 21, 1998, now U.S. Pat. No. 6,381,090.

FIELD OF THE INVENTION

The present invention relates to hard disk drives used to store data, and more particularly to a head-media system having reduced stiction and low fly height capability.

BACKGROUND OF INVENTION

In the field of hard disk storage systems, continuous improvements have been made in increasing the areal density, i.e., the number of stored bits per unit of surface area. As is well known, decreasing the fly height of the read/write head results in reduced pulse width (PW50) due to a number of factors which allows for greater recording density. For a discussion of the effects of lower fly height, see, for example, U.S. Pat. No. 5,673,156. In any event, bringing the head closer to the media has been a key area of effort in increasing recording densities.

The read/write head is typically a part of or affixed to a larger body that flies over the disk and is typically referred to as a "slider". The slider has a lower surface referred to as the air bearing surface. The air bearing surface typically comprises one or more rails which generally generate a positive air pressure. In addition, there is often a cavity or similar structure that creates a sub-ambient pressure to counterbalance the positive pressure to some extent. The slider body is attached to a suspension via a head gimbal assembly which biases the slider body towards the disk. The net effect of the air bearing surface and the suspension is to cause the slider to fly at the desired height when the disk is at full speed, and to cause the slider to be in contact with the disk surface when the disk is at rest. The portion of the slider that contacts the disk is typically the aforementioned one or more rails. As the fly height of the slider is reduced, it is necessary to produce disks with increasingly smooth surfaces. As is well known, the slider undergoes sliding contact with a portion of the disk whenever the drive motor is turned on or off. This contact between the slider and the disk occurring when the drive is turned on and off is known as contact start stop (CSS) operation.

The CSS motion between the slider and the disk is of great concern in the reliability of the drive since it is generally the major initiator of failure in hard disk drives. In today's commercially available disk drives, generally 20,000 CSS cycles for desk-top computer applications and up to 100,000 CSS cycles for portable or hand-held computer applications is considered adequate. A greater number of CSS cycles is needed in portable and hand-held computer applications because the drives are frequently turned on and off to conserve battery power. Recently, there has been a trend to reduce power consumption in desktop computers. Therefore it is expected that CSS requirements will greatly increase for desktop applications as well.

In order to improve the CSS performance, it is well understood that friction must be minimized between the slider and the disk. Static friction or stiction is a term used to describe the force exerted against the motion of the slider relative to the disk surface when the slider is at rest on the disk surface. Stiction values are often given in grams to represent the force required to separate the slider from the disk. The stiction is greatly increased if the lubricant that is used on the surface of most disks wets a significant portion of the slider/disk interface.

Often, the term initial stiction refers to the stiction encountered when the slider contacts the disk for a minimal amount of time, without a significant opportunity for lubricant to migrate to the slider/disk interface. Parking stiction is a term used when the disk drive has not been in use, so that the slider has been at rest on the CSS zone for some time and may have some lubricant migration to the interface. Parking stiction is typically greater than initial stiction. Finally, the term fly stiction is used to describe the situation where the slider has flown over the disk for a considerable amount of time so as to pick up lubricant, and then after returning to the disk surface has remained on the disk surface for a sufficient time to allow the lubricant to flow to and significantly wet the interface, thereby greatly increasing stiction. Stiction can be strong enough to prevent the drive motor from turning, or worse yet, can damage the head, cause the slider to become detached from the suspension assembly, or cause the slider to ding the disk surface during separation of the slider from the disk surface. (The term "ding" is used in the art to describe an abnormal and sudden impact of the slider against the disk surface which dents the disk surface around the impact area. This can occur, for example, by accidentally dropping the disk drive on a hard surface. This can also occur when the slider is stuck on the disk surface during drive start-up due to high stiction, followed by sudden release of the slider, which causes it to bounce on and thereby dent the disk surface.)

It has been recognized that stiction can be reduced by putting a "micro-texture" on the disk surface to reduce the effective contact area between the slider and the disk. See, for example, Marchon et al., "Significance of Surface Roughness Measurements. Application to the Tribology of the Head/Disk Interface," Tribology and Mechanics of Magnetic Storage Systems VI, ASLE SP-26, page 71 (1990), which describes the roughness needed to achieve an acceptable rate of increase in stiction under prolonged CSS for a disk comprising an aluminum/NiP substrate with a near concentric texture pattern. Also, Lee et al., describe the effect of texture crossing angle on CSS performance in "Effect of Disk Cross Hatch Texture on Tribological Performance", published in IEEE Transaction on Magnetics, Vol. 28, No. 5, September 1992, pp. 2880–2882. In effect, a rougher texture and modification of texture morphology is needed to achieve acceptable CSS performance. The texture pattern may be put on the disk by mechanically abrading the substrate surface using well known methods.

In contrast to the requirements of CSS operation, for reading or writing data it is desirable that the surface of the disk be as smooth as possible to allow the head to fly as close as possible to the disk surface. Because of these differing requirements, it is known to use zone texturing where a portion of the disk used for CSS operation (the CSS zone) is textured more heavily than the portion of the disk used for data storage (the data zone). One problem with such zone texturing, however, is that it is difficult to create a precisely delineated CSS zone with mechanical texturing methods. Because of this, some portion of the data zone is typically lost, thus reducing the amount of data a disk can hold.

Because the data zone is smoother than the CSS zone, both the glide height (minimum distance at which a slider may fly without contacting any portion of the disk surface) and the glide avalanche height (distance above mean disk surface level at which the slider makes regular and continuous contact with the disk surface) are lower in the data zone than in the CSS zone. However, because it is necessary to move the head from over the data zone to the CSS zone, the glide avalanche height of the CSS zone limits the fly height over the data zone, as the head must be able to safely move between the two zones, without undue contact in the CSS zone which could lead to wear of the disk surface, the slider, and generation of debris. It should be noted that it is difficult to produce mechanical texturing with a high degree of uniformity. This nonuniformity in surface texture means that some portions of the CSS zone may be considerably rougher than average, which poses further limitations on the fly height.

Another known method to provide the necessary texture in the CSS zone is laser zone texturing. An example of this method is described in U.S. Pat. No. 5,108,781. In such a method, a laser beam is focused to a small spot on the disk surface, forming uniformly shaped and sized features in a controllable pattern. Because of the high degree of control possible with a laser system, the CSS zone can be precisely delineated so that loss of data zone area can be minimized. Furthermore, because the size of the features is better controlled than the surface morphology resulting from mechanical texturing, the above-described uniformity problem is greatly reduced. However, because the surface in the laser texture zone has a considerably greater roughness than the data zone, the CSS zone still provides a limitation to the fly height even in laser zone textured disks. See "The Special Needs of Server Class Drives" by Wachenschwanz et al., IDEMA Insight, Vol. XI, No. 1, January/February 1998 which illustrates that laser zone texturing achieves acceptable stiction performance for today's devices and further asserts that laser based zone textured disks should be extendible for at least two generations.

Another method to reduce stiction in CSS operation is to provide a texture on the surface of the slider rather than the disk. Such sliders are frequently referred to as "padded" sliders or "stiction-free" sliders. The texture may be provided in a variety of menners. For example, "Numerical Simulation of the Steady State Flying Characteristics of a Fifty Percent Slider with Surface Texture" by Wahl et al., IEEE Transactions on Magnetics, Vol. 30, No. 6, November 1994, discloses a slider having a plurality of hemispherical, conical, or cylindrical features arranged in a densely packed pattern thereon. U.S. Pat. No. 5,079,657 teaches several varieties of textured sliders using chemical etching in one embodiment formed by differential etching, and in another embodiment formed by the use of a masked photo resist layer. "Stiction Free Slider for Lightly Textured Disks", by D. Yamamoto et al., IEEE Trans. Mag. Vol. 34, No. 4, 1998, shows a textured slider which has one or more "pads" along the length of each rail. Herein, a slider having texture formed by any method, including the foregoing, with any type of pattern is referred to as a "textured" slider.

FIGS. 1A and 1B show two examples of textured sliders. As shown in FIGS. 1A and 1B, the sliders comprise a slider body 101a/b coupled to suspension 102a/b. Each of the sliders comprises two rails 103a/b (although sliders with a single rail and sliders with more than two rails may be used). Also as shown in FIGS. 1A and 1B, each of the rails has a plurality of pads 104a/b. In the particular slider shown in FIG. 1B, each pad 104b may have dimensions, for example, of approximately 35–50 microns wide by 50–100 microns long. Of course other dimensions may be used.

In the above described textured sliders, the intent is to provide a slider surface that has some portions at a different elevation than others to reduce the total contact area and thereby reduce stiction. One advantage to using such sliders is that a lower roughness of the disk surface is needed to meet stiction requirements. This lower roughness is comparable to the roughness of current data zone texture, so that the entire disk surface may be textured as appropriate for data storage, thus allowing for lower fly heights and increased density. Additionally, textured sliders are intended to eliminate the need for a separate zone, whether by mechanical texturing with its concomitant loss in usable area, or laser zone texturing which typically adds a step to the disk fabrication process. In the above mentioned article by Yamamoto et al., it is stated that the stiction results obtained with the stiction free slider described therein is acceptable even on relatively lightly textured surfaces which have a roughness comparable to current data zone texture. Recently, it has been reported that a textured slider may be extendible for the next several generations of disk drives. See "Fujitsu's Padded Slider Hold Stiction at Bay", Data Storage, May 1998, page 8.

A further approach to the stiction problem is drives using a so-called "load/unload" mechanism. In these drives, when the drive is turned off, the head is parked on a ramp and not on the disk surface. Therefore, in load/unload drives, the problem of stiction is eliminated. However, the load/unload mechanism adds to the cost and complexity of the drive.

As can be seen from the foregoing, current attempts are to either improve the disk texturing, with particular current emphasis on laser zone texturing or alternatively to eliminate the need for a separate zone by providing a textured slider or by providing a load/unload mechanism.

As recording density increases, ever smoother surfaces will be required so that heads may fly lower. Current state-of-the-art systems have glide avalanche heights in the data zone of approximately 0.8 through 1.0 microinch ($\mu''$). In the future, glide avalanche heights of approximately $0.4\mu''$ or below will be needed for disks having densities in the range of approximately 3–5 gigabits per square inch (Gb/in$^2$). On a laser zone textured disk, the glide avalanche height for such CSS zone would need to be in the range of approximately $0.6$–$0.7\mu''$. An average laser bump height in the range of approximately 50–100 angstroms (Å) will provide a glide avalanche height in this range, but is likely to have unacceptably high stiction for conventional sliders. Thus, what is needed is a method and apparatus for providing a slider-head system having very low glide height and acceptable stiction performance.

SUMMARY OF THE INVENTION

A method and apparatus having a disk and body for use in a disk drive system is described. In one embodiment, the apparatus includes a disk and a body in sliding contact with a contact surface of the disk during a portion of an operation of the disk. The body has a surface comprising a pattern of features having a first distance between the features. The disk comprises at least a first zone that includes the contact surface. The first zone has a roughness comprising a plurality of protrusions having a second distance between the protrusions. The second distance between the protrusions is less than the first distance between the features.

Other features and advantages of the present invention will become apparent from the detailed description, figures and claims which follow.

DETAILED DESCRIPTION

A head-media system comprising a textured slider and a disk having a CSS zone with a greater roughness than a data zone. In the following description, numerous specific details are set forth such as specific sliders, disks, roughness values, etc. It will be appreciated, however, that these specific details need not be employed to practice the present invention. In other instances, well known methods and apparatuses are not described in detail in order not to obscure unnecessarily the present invention.

Figure 2:
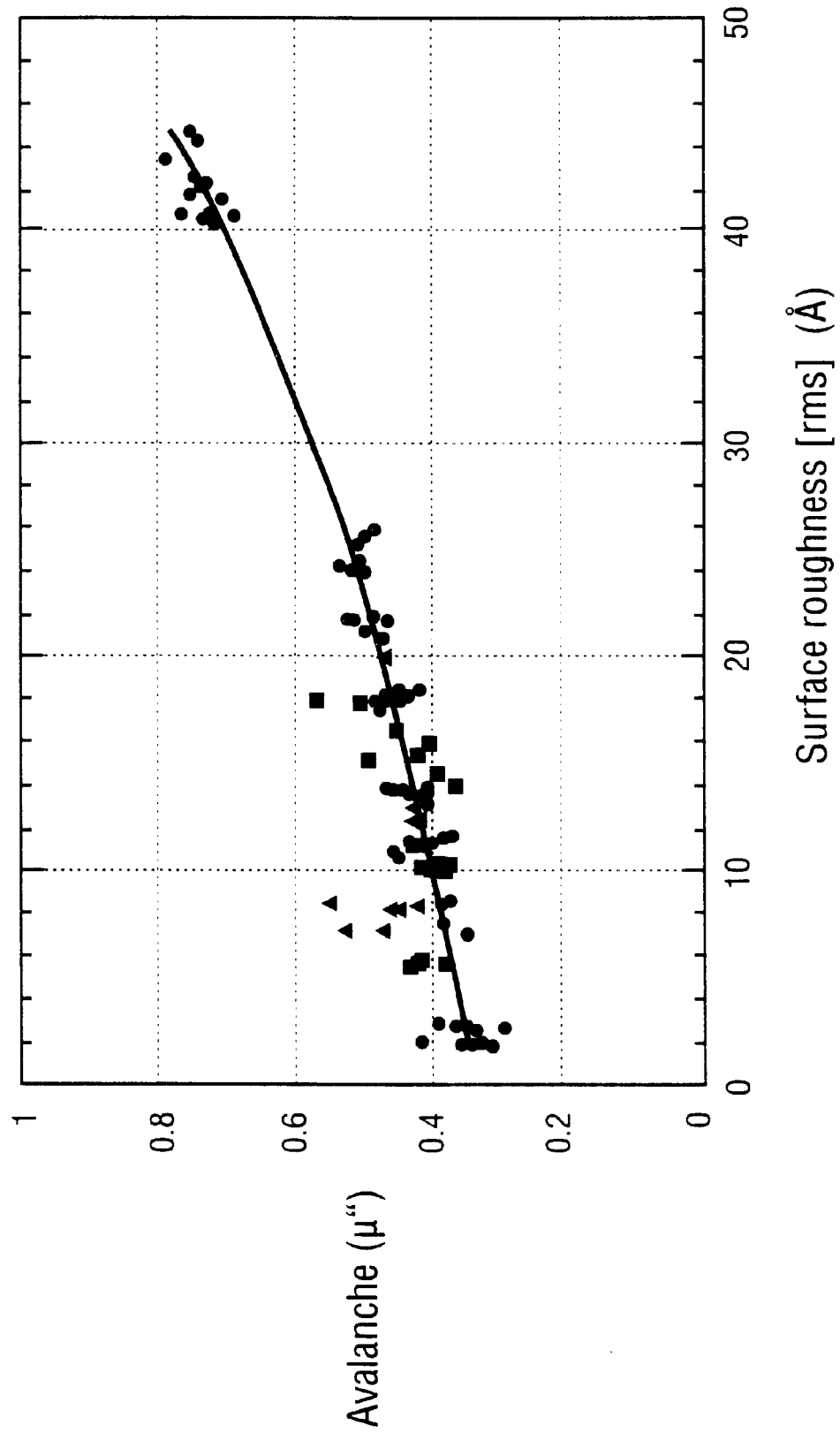
FIG. 2 shows glide avalanche height as a function of surface roughness.

As described earlier, one important parameter is the glide avalanche height which is the height at which the lowest portion of the slider begins to make regular contact with the disk. Typically, the glide avalanche is stated as distance above the average surface height, typically expressed in microinches. Referring to FIG. 2, a graph of surface roughness (RMS Roughness) versus avalanche height for a mechanically textured disk surface is shown. As expected, as the surface gets smoother, the glide avalanche is reduced. As is well known in the industry, a lower glide avalanche point is needed for lower fly heights. It is believed that in disks having a density in the 3–5 Gb/in$^2$ range, the glide avalanche in the data zone will need to be approximately 0.4$\mu$". Although the CSS zone need not have as low a glide avalanche as the data zone, it too must be reduced to enable lower fly heights over the data zone, because too great a disparity in glide avalanche between the two areas would cause excessively severe wear on the slider as the head is moved back and forth, as described previously. For disks having the aforementioned 3–5 Gb/in$^2$ density, it is believed that the glide avalanche height in the CSS zone should be in the range of approximately 0.6–0.7$\mu$". Referring to FIG. 2, it can be seen that to meet the above requirements the data zone would need to have a maximum RMS roughness of approximately 10–15 Å, and the CSS zone would need to have a maximum RMS roughness of approximately 35 Å.

Also as described earlier, it is preferable not to have two mechanically textured zones because it drastically reduces the amount of space for storing data, and adds to process complexity. A disk textured in its entirety with the requisite low roughness needed for advanced densities would therefore require a surface roughness of about 15 Å RMS or lower, which corresponds to an Ra roughness of approximately 12 Å or lower.

Figure 3A:
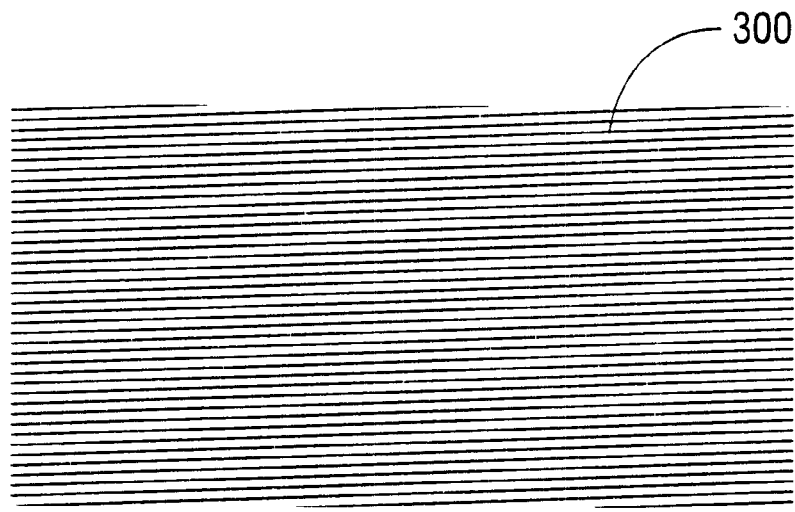
FIGS. 3A and 3B illustrate the data zone and the CSS zone, respectively, of a laser textured disk.
Figure 3B:
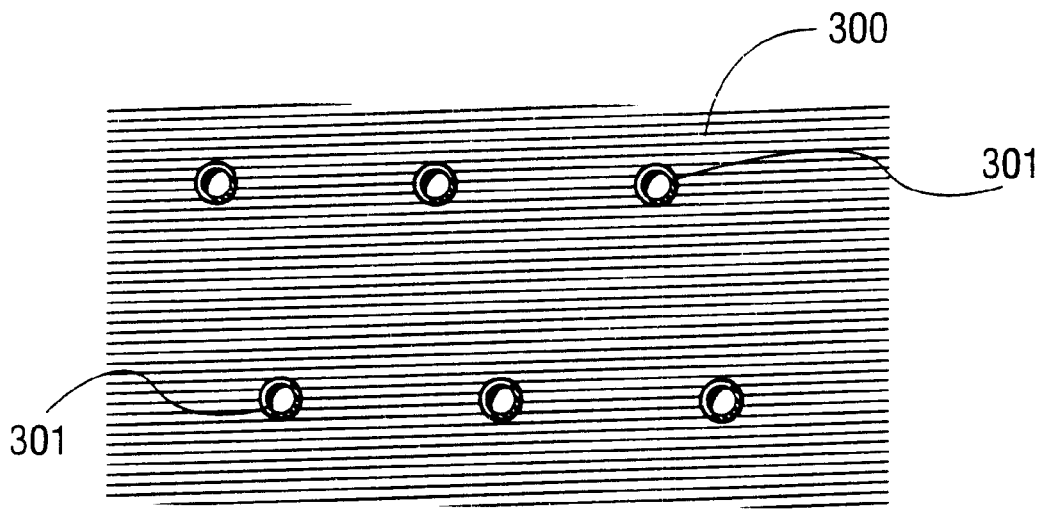

Referring to FIG. 3A, a portion of the data surface of a disk is shown. As can be seen, the surface 300 has mechanical texturing thereon. FIG. 3B shows the CSS zone of the same disk where laser zone texturing was used. As can be seen, the surface still has mechanical texturing 300 as well as numerous laser features 301 thereon. The laser features 301 shown in FIG. 3B are generally circular, crater shaped features. It will be appreciated that other types of laser features such as the so-called "sombrero" type, or other shapes of the laser features may be used in the below described embodiments of the present invention utilizing laser texture. Typical horizontal dimensions of laser features, for example measuring from one side of the rim to the other, are in the range of about 1 micron through several microns. It will be appreciated of course that dimensions outside this range may be used in the present invention as well. The average height of the features 301 above the surface 300 is approximately 200–300 Å in most state of the art devices.

Figure 4:
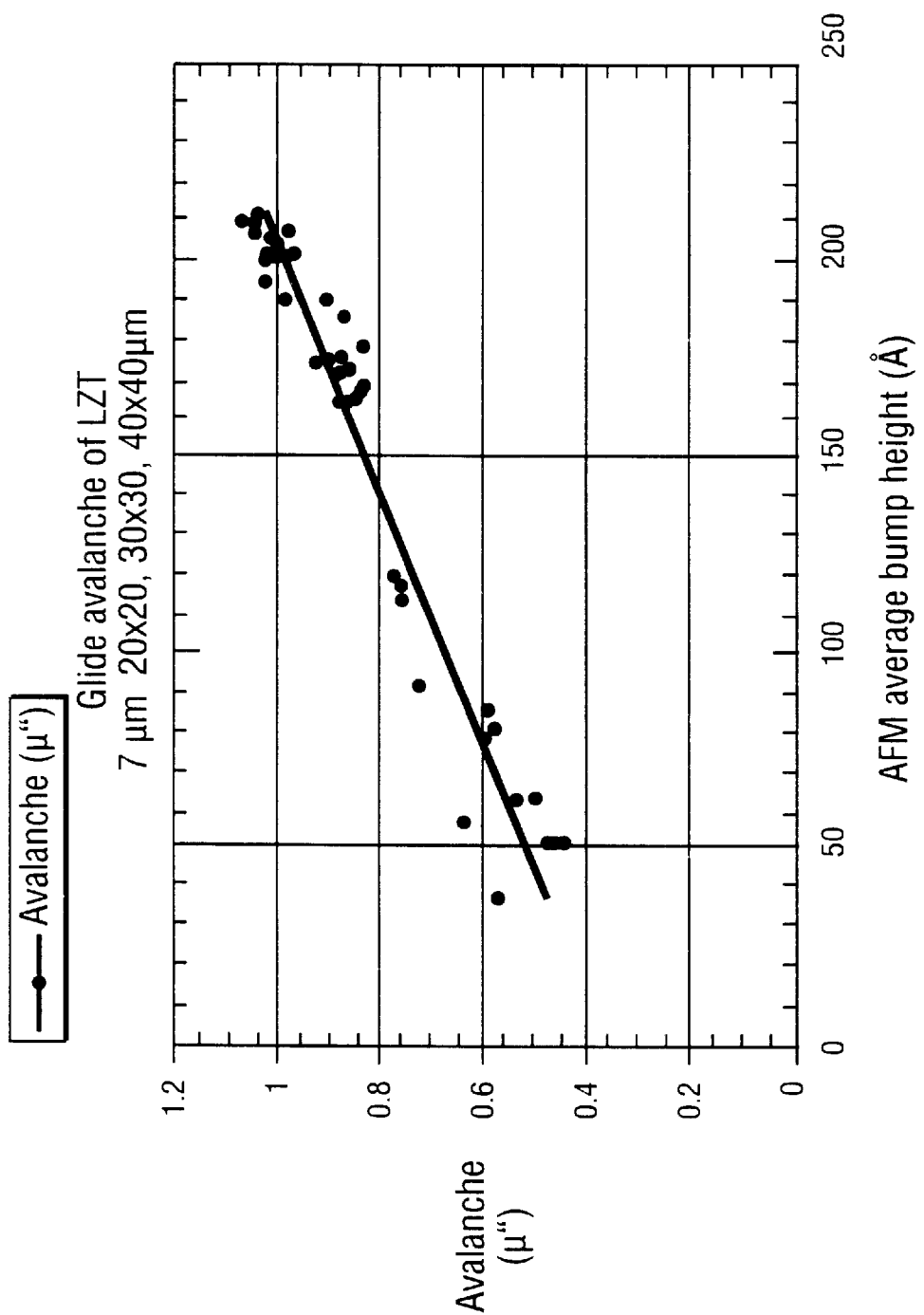
FIG. 4 shows glide avalanche height as a function of average bump height for a laser textured disk.

Referring now to FIG. 4, a graph of bump height as measured by an atomic force microscope (AFM) versus the glide avalanche is shown. As can be seen, a bump height in the range of approximately 200–250 Å results in a glide avalanche of approximately 0.85–1.1$\mu$". While this glide avalanche is acceptable for the CSS zone of current devices, as noted above a much lower glide avalanche will be required for future devices. For example, to achieve a glide avalanche of approximately 0.6$\mu$", an average bump height of approximately 100 Å is needed.

As will be seen it has been found by the present inventors that the use of a textured slider on a very lightly textured disk (e.g., avalanche height of about 0.4$\mu$") may encounter stiction problems after use. Furthermore, although considerable effort is being expended to produce textured sliders for current and future requirements, considerable development work remains. Similarly, with respect to laser texture, significant effort will be required to provide features having a low enough height for glide avalanche requirements without poor stiction performance. It would be desirable to provide for good stiction performance at low glide avalanche heights utilizing currently manufacturable technology for current and future devices. Furthermore, it would be desirable that the system be robust to provide an acceptable operating window.

To overcome these problems, the present invention comprises the use of a textured slider together with a disk having a separate zone having a greater roughness than the data zone. In one embodiment, a mechanically textured zone may be used if desired. Although this embodiment would still have the above described problems of mechanically zoned disks of the prior art, i.e. loss of some of the surface area of the disk for data storage, and greater nonuniformity than laser texturing, such an embodiment achieves improved stiction results as compared with a textured slider used on a disk textured entirely as is needed for the data zone. Alternatively, other methods of texturing may be used such as texture provided by sputtering, top surface texturing wherein the carbon overcoat is in some way treated to provide a texture, by various patterning methods to provide features, or as described in detail herein, by a method such as laser texturing.

In a particularly preferred embodiment, the invention comprises a disk having a zone that is textured by forming a plurality of features of uniform height, such as features formed by use of concentrated radiation in the CSS zone. For purposes of discussion, the latter embodiment will be discussed in conjunction with laser texturing for illustration. It will be appreciated, however, that any method of forming features with this morphology i.e. texture by way of discreet and relatively uniform protrusions, as opposed to random surface texturing characteristic of mechanical texturing processes and some chemical texturing processes, will provide the benefits of this embodiment. As will be seen, by use of this method, stiction results approximately equivalent to results achieved with a stiction-free slider when used on a mechanically textured surface of high roughness are achieved. Because of the use of a textured slider, the average laser feature height can be very low, such as 100 Å for disks storing approximately 3–5 Gb/in$^2$ and lower heights for capacities beyond this range, without encountering the above described stiction problems of such small bumps. Because the glide avalanche height of such bumps is relatively small, the disk may be used in high density applications.

Figure 5:
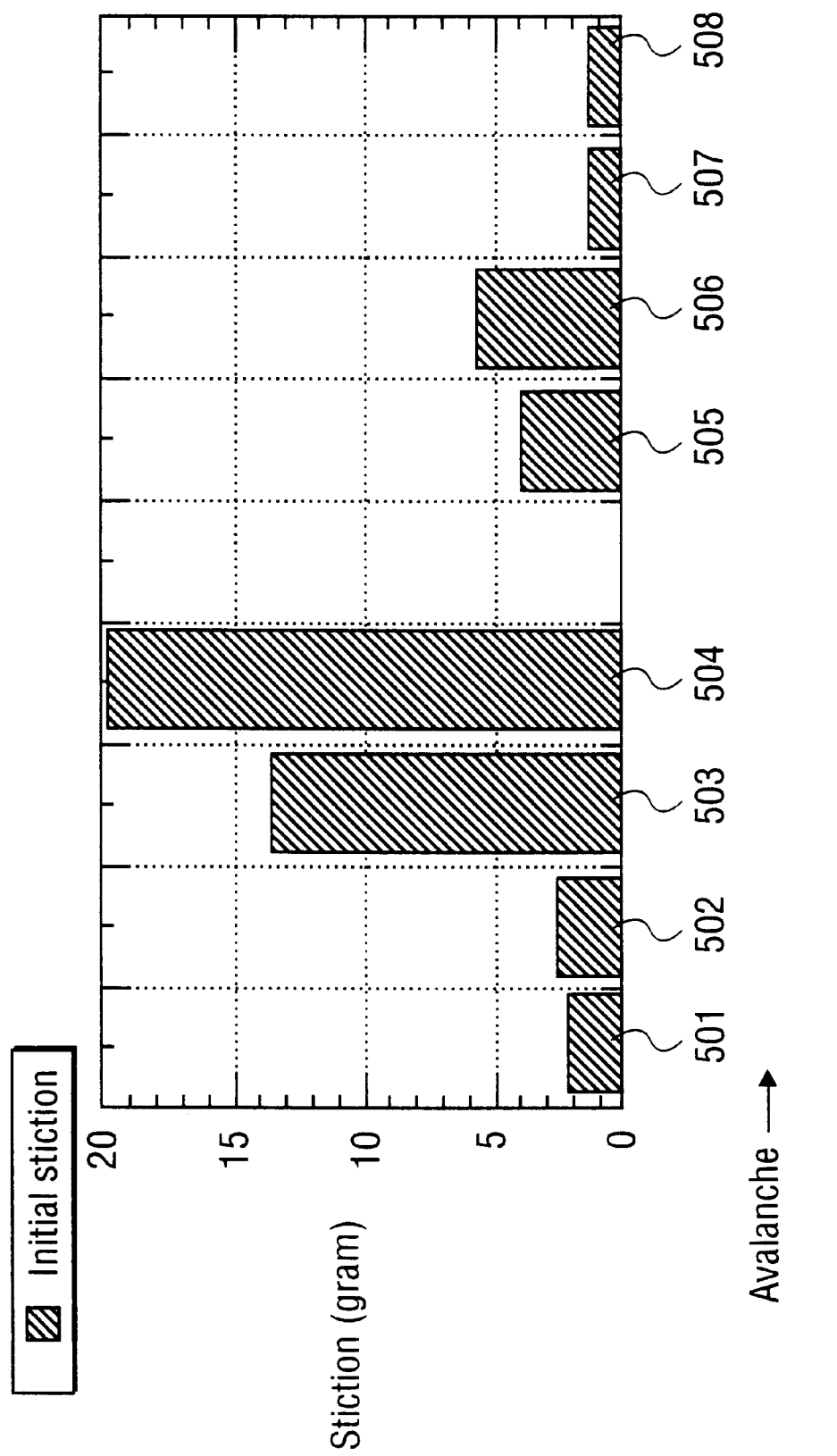
FIG. 5 shows initial stiction results for a textured slider on a low roughness mechanically textured surface, and on a laser textured surface.

Referring to FIG. 5, a bar graph of stiction in grams is shown. The texture on the slider comprised a pattern of small protrusions or bumps over most of the surface of the rails such as is shown in the article by Wahl et al. Herein, such textured sliders will be referred to as "full texture" sliders. FIG. 5 shows the stiction for this slider on several different disk surfaces. Bar 501 shows the initial stiction on a mechanically textured portion of a disk having a glide avalanche of 0.5$\mu$". As can be seen, the amount of stiction is clearly within an acceptable range. Bar 502 shows the stiction in another mechanically textured region having a glide avalanche of approximately 0.45$\mu$", and again as can be seen the stiction is acceptable. Bars 503 and 504 show the stiction in two more mechanically textured locations on the disk, both with a glide avalanche height of 0.45$\mu$". However, the locations represented by 503 and 504 show the stiction results after the same slider has undergone a few hundred CSS cycles. As can be seen, the stiction has now gone well above acceptable limits and is now in the range of approximately 13–20 grams. This data suggests that some type of degradation in the condition of the slider surface occurs after a significant number of CSS cycles. It appears that the condition of the disk does not cause the degradation as each bar represents a new location on the disk. This head degradation significantly degrades the stiction performance on very smooth surfaces.

Referring now to Bars 505, 506, 507, and 508 stiction results using the same slider that was used to produce Bars 501–504 is shown. The data for Bars 505–508 was generated with this slider after it had generated the data for Bars 501–504 so that the slider at this point has had considerable degradation. Bars 505–508 represent stiction results from laser textured disk surfaces that have glide avalanche heights of 0.60$\mu$", 0.65$\mu$", 0.85$\mu$" and 1.20$\mu$" respectively. The patterns of the laser features were 25 $\mu$m×25 $\mu$m, 20 $\mu$m×20 $\mu$m, 20 $\mu$m×40 $\mu$m, and 50 $\mu$m×50 $\mu$m, respectively, where the first number represents the spacing of features along the track i.e. in the circumferential direction, and the second number represents the spacing of the features radially. As can be seen, in all cases the stiction remained at acceptable levels, even though the textured slider had degraded considerably such that the stiction rose to high levels in very smooth regions.

As noted earlier, the CSS zone needs to have a glide avalanche in the range of 0.6–0.7$\mu$" or less in the next couple of generations of drives. As can be seen from Bars 505 and 506, which represent zones with glide avalanche heights of 0.60 and 0.65$\mu$", the present invention provides acceptable stiction results for future devices. Referring back to FIG. 4, as can be seen, the average bump height to achieve this glide avalanche is approximately 100 Å. Thus, the height of the laser features is much lower than currently being used in laser textured disks which use greater average heights to avoid stiction problems.

Referring again to FIG. 5, it will be noted that the glide avalanche of the slider/disk system of the present invention (Bars 505–508) is at a higher glide avalanche than the mechanically textured regions shown in Bars 501–504 which have a smooth surface characteristic of data zone regions. In embodiments using a mechanically textured CSS zone, the mechanically textured region should have a similar glide avalanche as the laser texturing used in FIG. 5 to achieve comparable results. However, importantly, the laser texture embodiment avoids having the need to produce a mechanically zoned disk that loses valuable data storage area. In any embodiment, the present invention avoids having to limit the data zone roughness by the higher roughness needed for acceptable stiction performance in future devices.

Figure 6A:
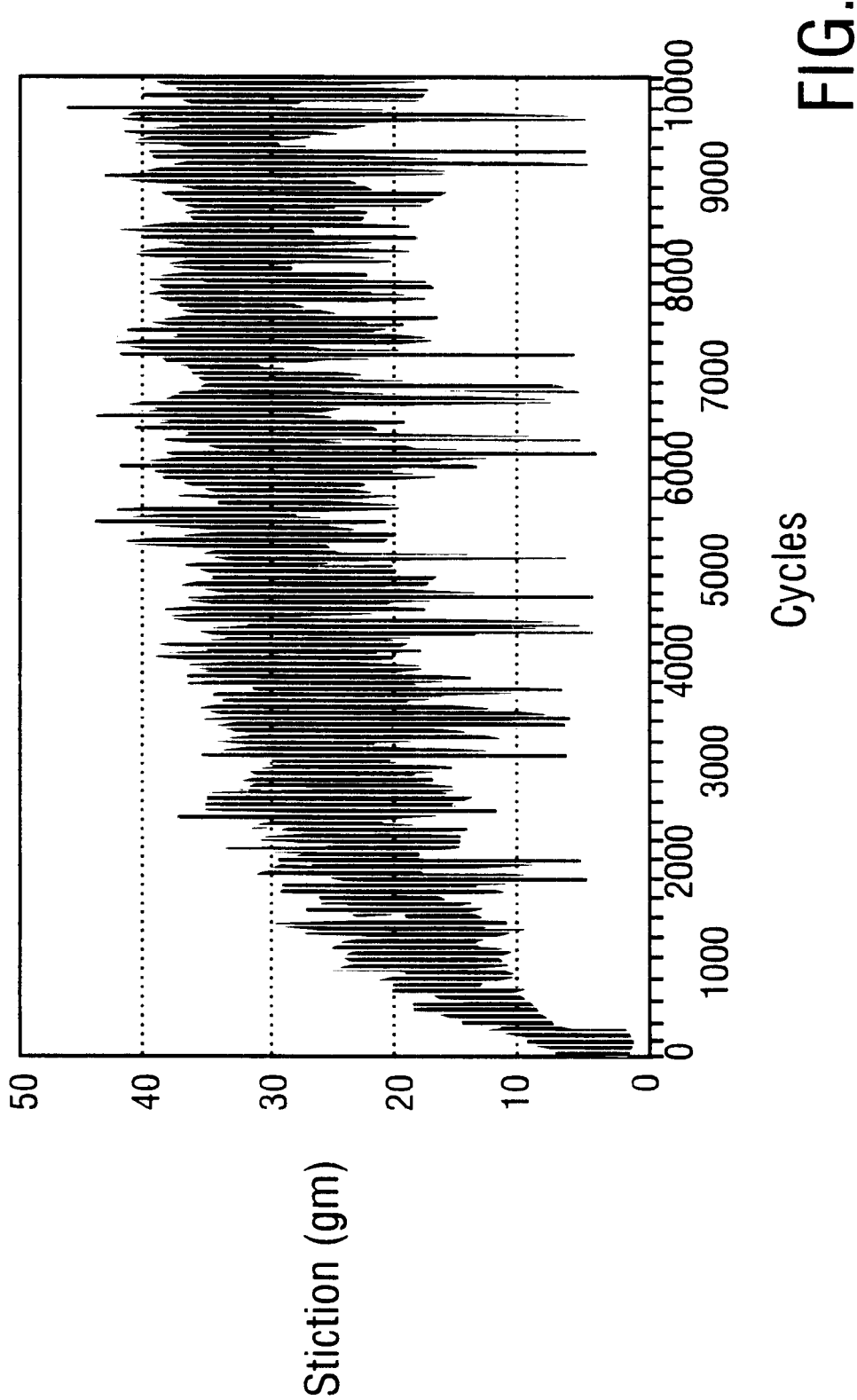
FIGS. 6A, 6B, and 6C show initial stiction over 10,000 cycles for a textured slider on a mechanically textured surface of a first roughness, a mechanically textured surface of a second roughness, and a laser textured surface, respectively.
Figure 6B:
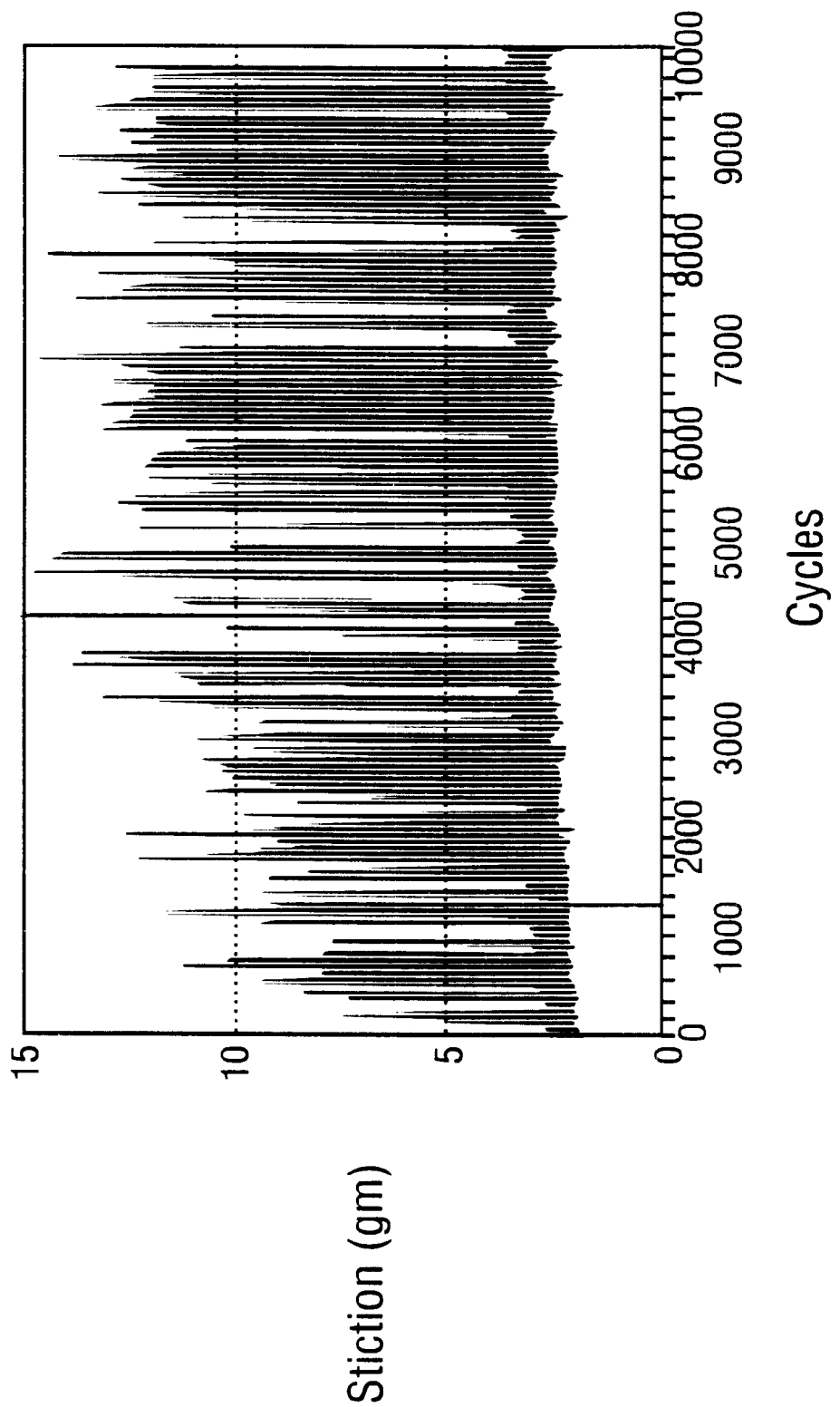
Figure 6C:
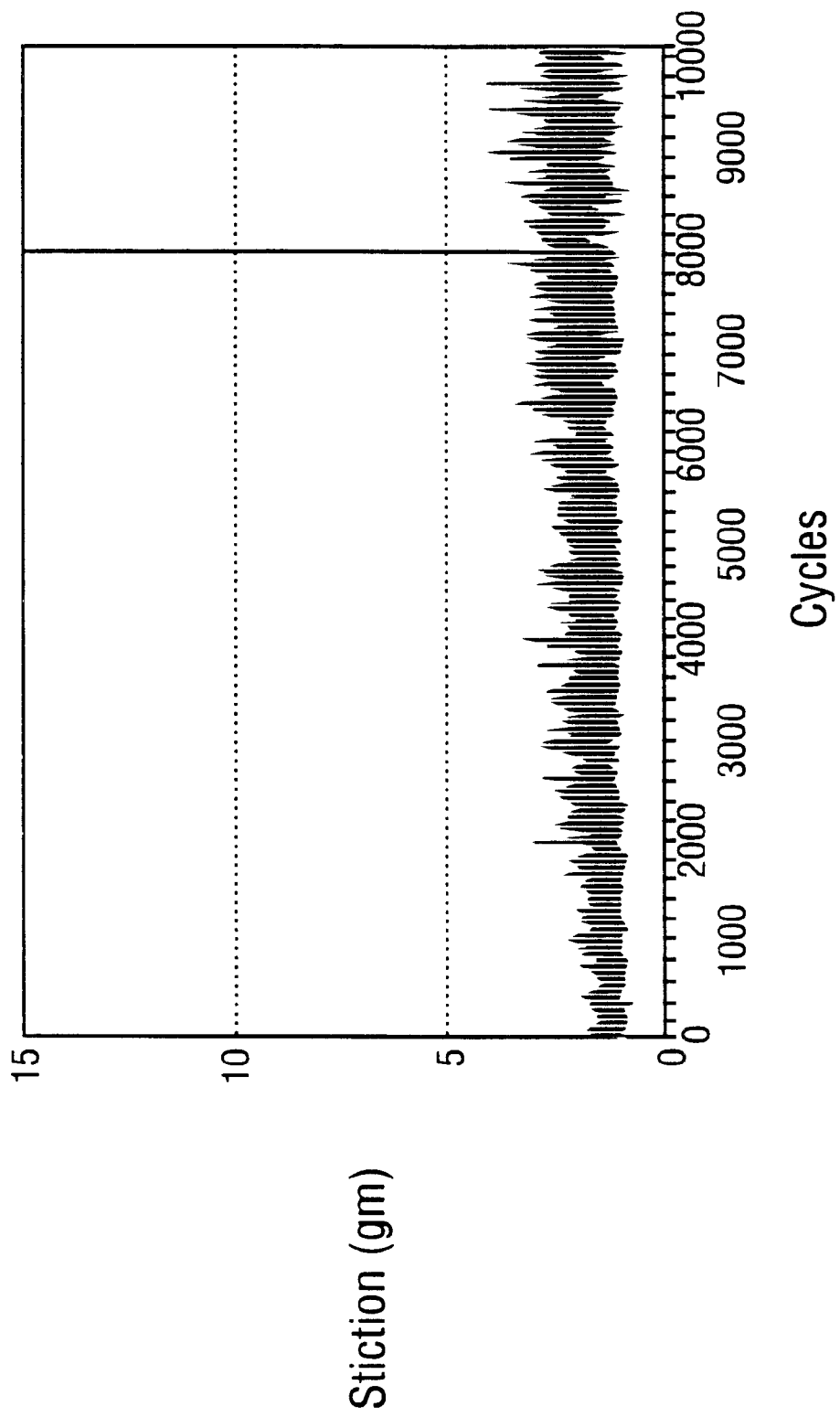

FIGS. 6A–6C illustrate the improvement achieved with the present invention. FIGS. 6A–6C show initial stiction in grams versus cycle number, for 10,000 cycles. The textured slider used in FIGS. 6A–6C was again a full texture slider. In the graph of FIG. 6A, the slider was used on a very smooth mechanically textured surface. The surface had a roughness Ra in the range of approximately 10 Å and a glide avalanche height of approximately 0.4–0.5$\mu$". As can be seen, the stiction quickly exceeded 10 grams after several cycles, and exceeded 30 grams after a couple thousand cycles.

FIG. 6B shows initial stiction for a textured slider on a mechanically textured surface having an average roughness Ra of approximately 16 Å. As can be seen, by using a higher roughness the stiction results are greatly improved with the stiction being slightly over 10 grams after 10,000 cycles. The results can be further improved by providing an even rougher surface in the CSS zone. Note that the roughness of approximately 16 Å is much lower than the approximately 35 Å roughness upper limit needed for the CSS zone for producing systems in the 3–5 Gb/in$^2$ range. Thus, FIG. 6B illustrates the benefits of a mechanically textured zone having a roughness greater than the data zone.

Referring to FIG. 6C, the stiction versus cycle for 10,000 cycles for a disk having laser features thereon is shown. In the graph of FIG. 6C, the CSS zone had laser textured features with an average height of approximately 85 Å and a glide avalanche height of approximately 0.6$\mu$". As can be seen, the typical stiction value is well under 5 grams (with the exception of 1 parking stiction event as shown by the spike in the graph) for the entire 10,000 cycles. The average initial stiction in FIG. 6C after 10,000 cycles was approximately 2.3 grams. The maximum stiction, other than the parking event, was 4.5 grams. This compares particularly well to the first 10,000 cycles of FIG. 6A. In comparing the graphs, note the scale difference in the Y axis.

Figure 7:
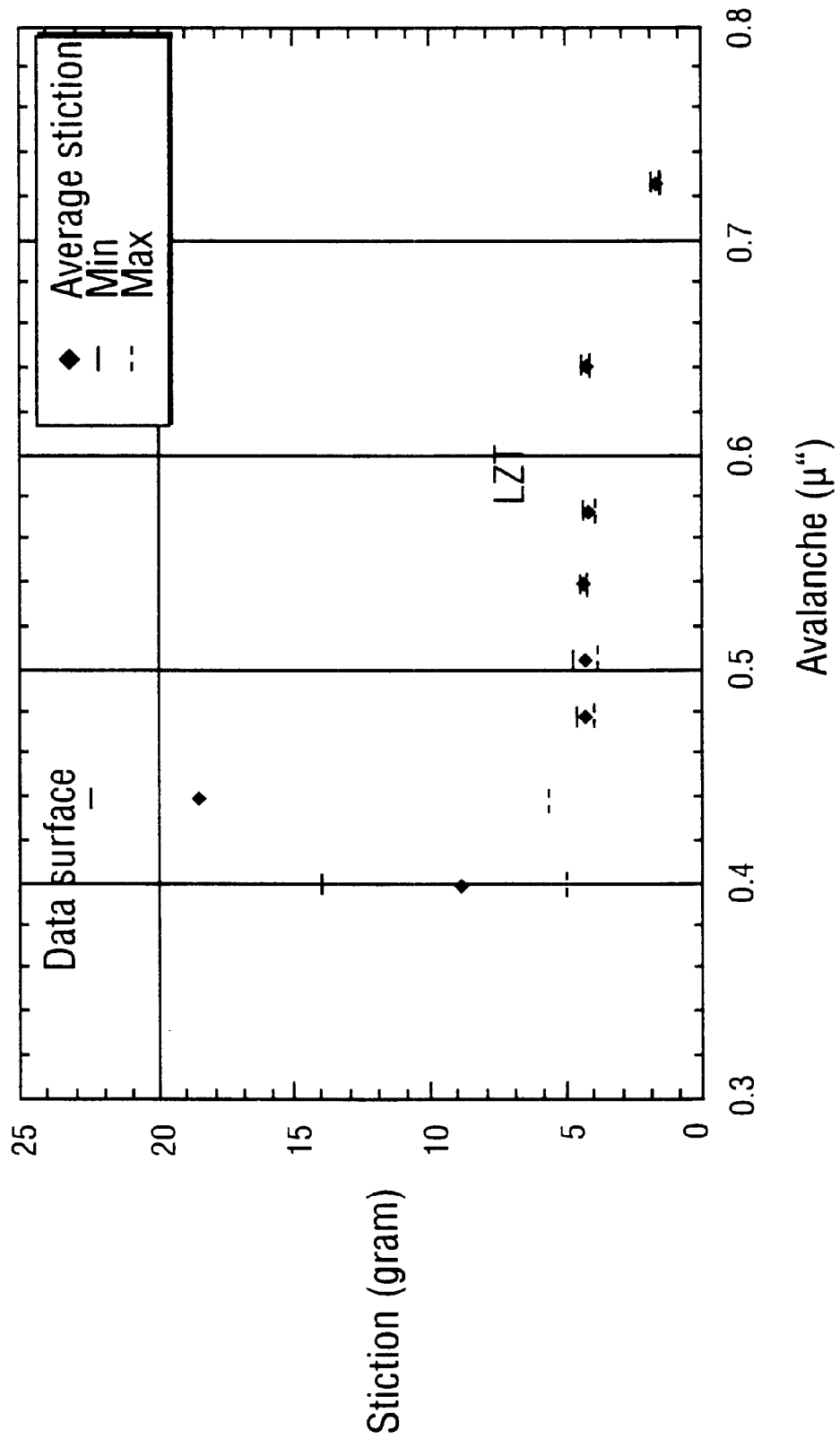
FIG. 7 shows initial stiction as a function of glide avalanche height for an embodiment of the present invention.

FIG. 7 further shows the results of the present invention. Shown in FIG. 7 is the average initial stiction in grams versus the avalanche height for a full texture head on a laser textured surface. As can be seen, by use of the present invention the stiction can be kept to acceptable levels even when the glide avalanche is below 0.5$\mu$". Thus, the present invention will allow for acceptable stiction performance on disks having low glide avalanche in the CSS zone, as required by future 3–5 Gb/in² devices and beyond.

Figure 1A:
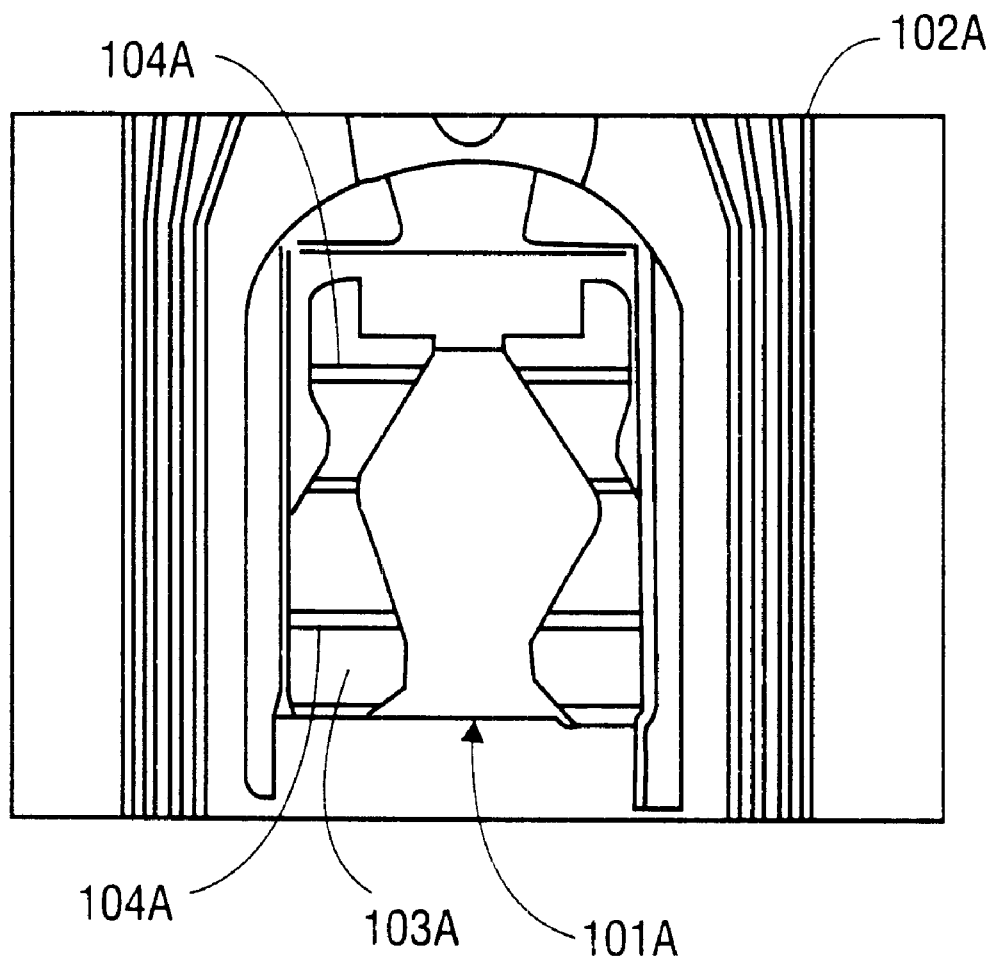
FIGS. 1A and 1B show two exemplary types of textured sliders.
Figure 1B:
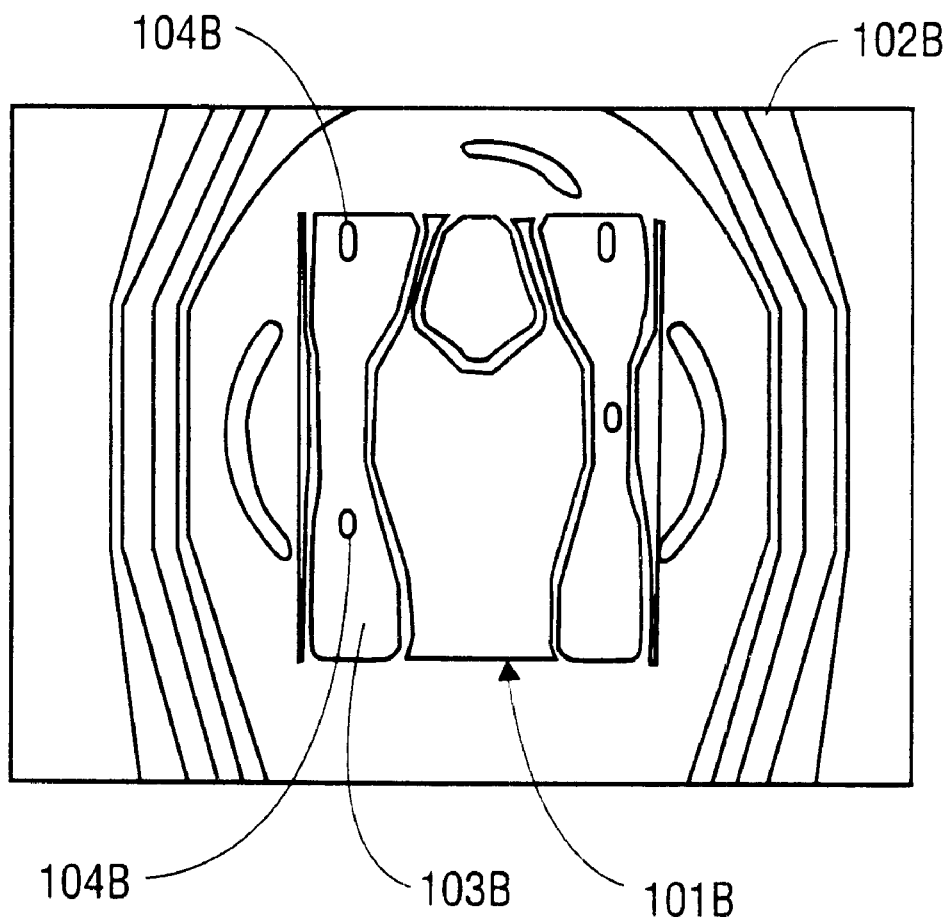
Figure 8:
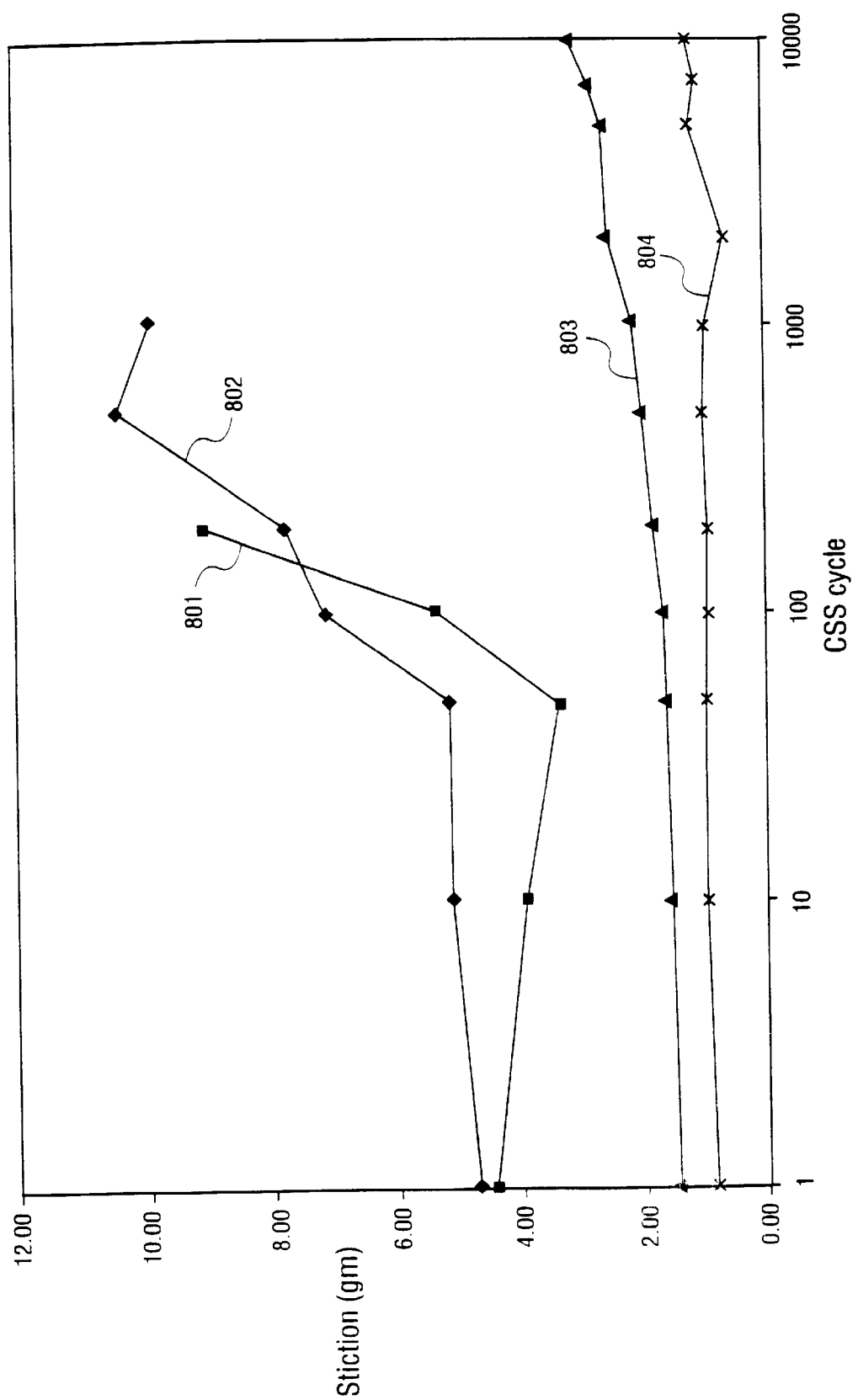
FIG. 8 shows stiction results over 10,000 cycles for a textured slider on mechanically textured surfaces and on a laser textured surface.

FIG. 8 again shows the improvement achieved with the present invention. Curves 801, 802, 803, and 804 show stiction in grams as a function of CSS cycle. The slider design used in all of Curves 801–804 was a four pad design similar to the design illustrated in FIG. 1B, with two of the pads 104b on each of two rails. Curves 801 and 802 show the results for the slider when used on a mechanically textured surface having an Ra roughness of approximately 10 Å. As can be seen, the initial stiction is marginal at about 5 grams and after approximately 100 cycles increases up to approximately 10 or more grams, which increase is believed to be due to head degradation as described earlier. Curve 803 was generated using the same type of slider but on a mechanically textured surface having an Ra roughness of approximately 20 Å. As can be seen, the stiction behavior is generally very good. Finally, Curve 804 was generated with the same type of slider but on a CSS zone having laser features. The laser features had an average height of approximately 85 Å and a glide avalanche height of approximately 0.6μ". As can be seen, even after 10,000 cycles, the stiction remained below 2 grams. It should be further noted with respect to curves 803 and 804 that not only do these embodiments of the present invention achieve low stiction, but the stiction remains low over many cycles, indicating that the present invention is relatively insensitive to degradation of the textured slider.

Figure 9A:
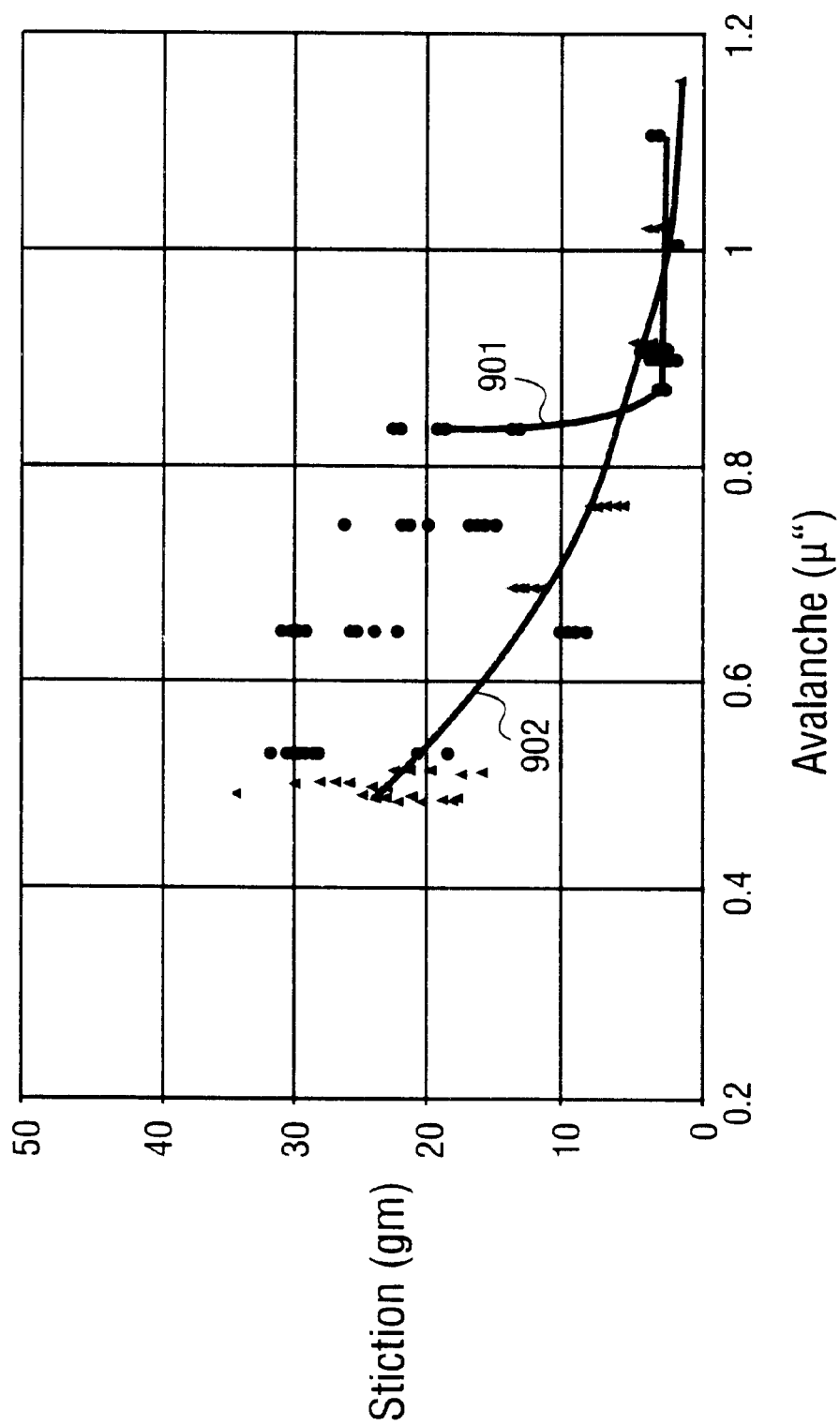
FIGS. 9A and 9B show stiction as a function of glide avalanche height for a conventional slider and for an embodiment of the present invention, respectively.
Figure 9B:
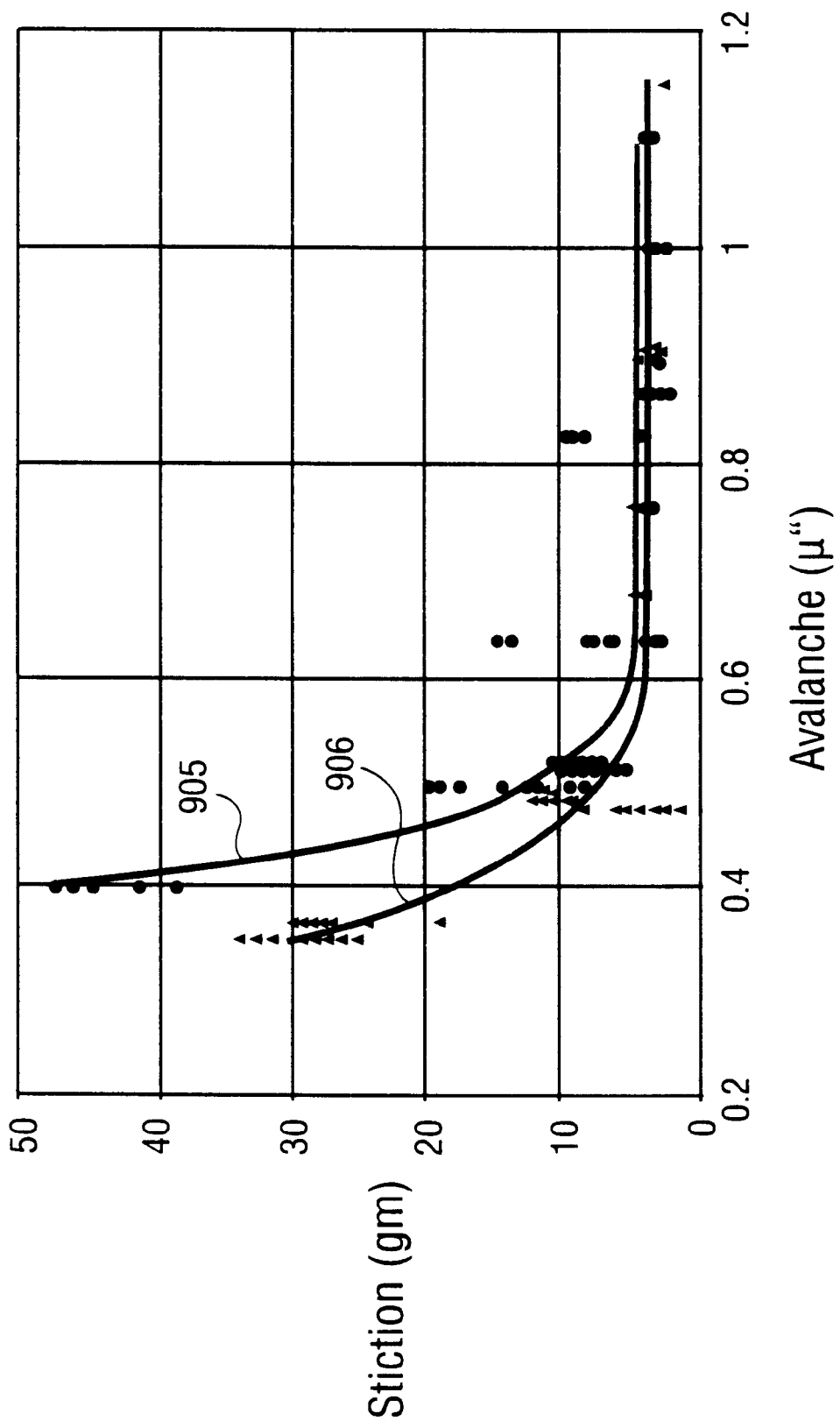

As shown in FIGS. 5–8, the present invention provides for reduced stiction when using a textured slider on a CSS zone in accordance with the present invention. FIGS. 9A and 9B illustrate the improvement of the present invention as compared with a non-textured slider. First referring to FIG. 9A, a graph of avalanche height versus stiction in grams is shown. In FIG. 9A, curve 901 shows the results for the conventional slider on a laser textured surface and the Curve 902 shows the conventional slider on a mechanically textured surface. As can be seen, the stiction with a conventional head on a laser textured surface typically reaches unacceptable values at a glide avalanche height of around 0.8μ". The stiction on the mechanically textured surface reaches unacceptable levels at approximately 0.7μ". The stiction response is generally more gradual on the mechanically textured surface as compared with the laser textured surface because the laser textured surface generally has peaks with relatively uniform heights, so that the surface area contacted increases much more rapidly on a laser textured surface as the slider is moved closer to the disk.

Referring now to FIG. 9B, a graph of avalanche height versus initial stiction for a full texture slider is shown. Curve 905 shows the results for the textured slider on a mechanically textured surface. As can be seen, the stiction results are improved over FIG. 9A by virtue of the use of the textured slider. Curve 906 shows the stiction results for the textured slider on a surface having laser texturing. As shown by curve 906, the use of a textured slider on a CSS zone having laser features dramatically improves the initial stiction. As can be seen, in contrast to FIG. 9A the stiction remains under 5 grams at 0.8μ" glide avalanche height and on average remains below this value to about 0.4μ" glide avalanche height.

Figure 10:
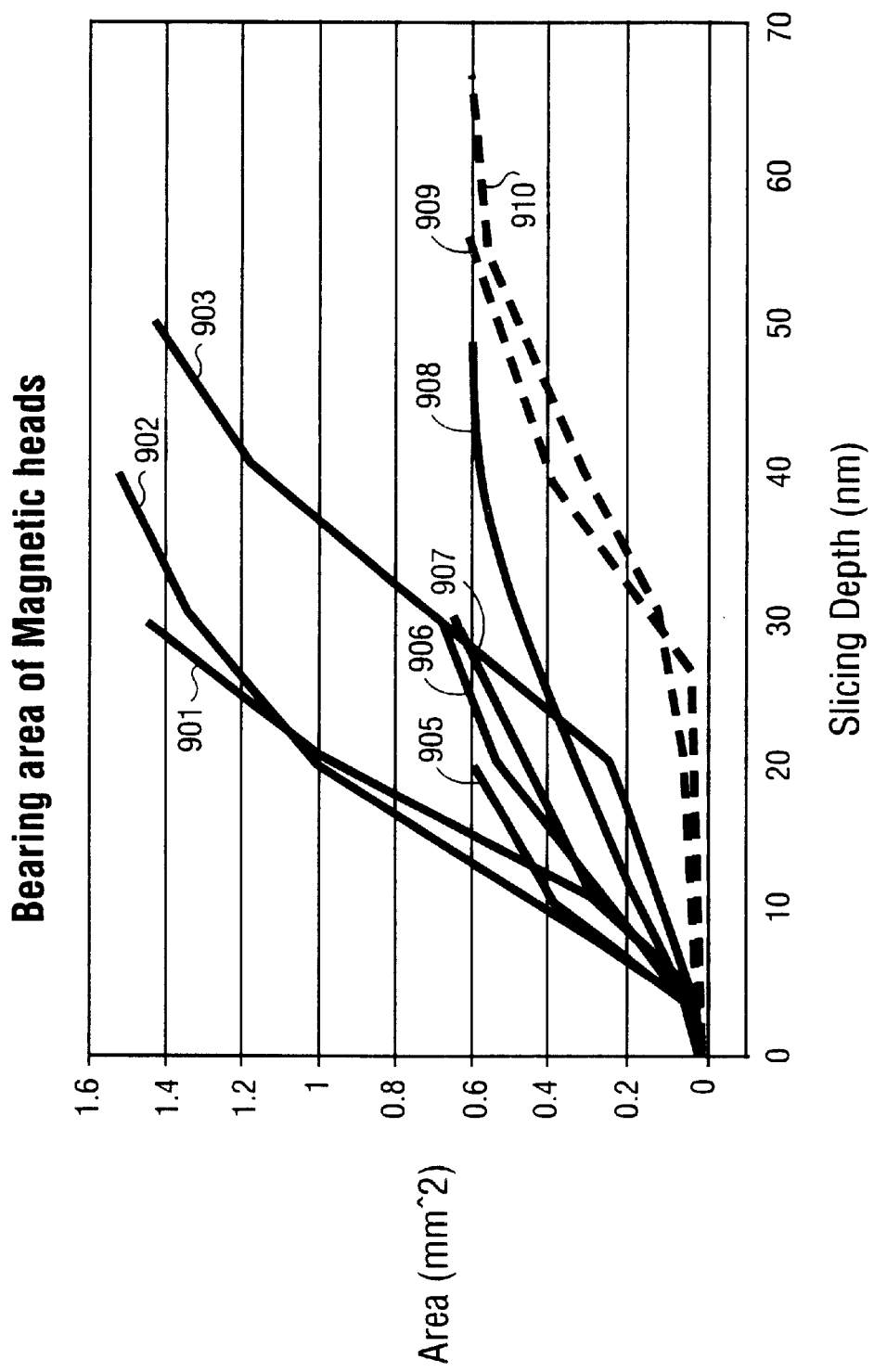
FIG. 10 shows contact area of the slider surface as function of slicing depth.

FIG. 10 shows a bearing ratio curve for several types of sliders. The curves show the percent of the slider area in contact with the surface as a function of distance from the disk surface. The chart shows the contact area in mm² of the slider as a function of slicing depth into the surface of the slider—i.e. a depth of zero indicates the first point of contact with greater contact at greater slicing depths. Curves 1001, 1002, and 1003 show current designs having a contact area of approximately 1.4 mm². Curves 1005–1010 show so called "pico" sliders which have a reduced form factor and have a lower total contact area of approximately 0.6 mm² used in advanced designs. The curves 1009 and 1010 represent curves for textured sliders. Because the sliders have some type of texture, the area increases very slowly with slicing depth as compared with non-textured sliders. It has been found that the present invention works well with all types of textured sliders. In particular however, the best results appear to be obtained with sliders that have numerous point contact areas such as that shown in the article by Wahl et al., or other sliders with multiple points of low surface area contact such as some of the sliders shown in U.S. Pat. No. 5,079,657, or sliders according to the teachings of U.S. Pat. No. 5,673,156. It will be appreciated that any textured sliders including the foregoing, or sliders having a combination of the various types of textures, such as a pattern of small protrusions in one portion, and a single large area pad in another, may be used in the present invention.

The laser features on the disk in laser texture embodiments were made and formed using conventional patterns. As described herein, the typical average height of the laser texture features may be much less than is used with a non-textured slider. For example, laser features in the range of approximately 50 Å–150 Å provide for lower glide avalanche, needed to improve fly height in the data zone. Further, reduced laser feature height may be used in future devices requiring even lower glide avalanche height. However, by use of a textured slider, the stiction is considerably reduced compared with that which would be obtained by use of a conventional slider on such small laser features.

In designing the laser texture pattern one consideration is that the pattern should be such to ensure that the textured surface contacts the laser features. For example, in the padded slider shown in FIGS. 1A and 1B, the radial spacing between the laser features should be less than the width of the narrowest pad, (e.g., less than approximately 35–50 μm radial spacing for the exemplary dimensions given in conjunction with FIG. 1B) so that it is ensured that each pad lands on a laser feature. Similarly, the distance between each laser feature in the circumferential direction should be no more than the length of the shortest pad (e.g. less than approximately 50–100 μm circumferential spacing for the exemplary dimensions given in conjunction with FIG. 1B). In this way, the elevated portions on the slider are ensured to contact the texture features on the disk to minimize surface area contact and therefore stiction. As used herein, the higher or greater elevation on a slider is considered to be a portion closer to the disk surface than other portions. For sliders that comprise texturing over a greater area, such as sliders having a plurality of protrusions over the entire surface and sliders with stripes and bars, the laser feature pattern can be less dense than for the sliders having a limited number of pads.

While the invention has been described with respect to specific embodiments thereof, those skilled in the art will recognize that changes can be made in form and detail without departing from the spirit and scope of the invention. The use of a textured slider and a disk having a CSS zone with a rougher texture provides the ability to achieve low fly heights, while achieving acceptable stiction in the CSS zone. In one embodiment, a texture comprising precisely placed features of uniform height, such as those formed by radiant energy focused to a spot on the disk, is used. The precise placement allows for a precisely delineated CSS zone maximizing area usable for data storage. The good uniformity reduces the margin that must be added to the fly height to account for the highest peaks in the CSS zone. Preferably, the ±3 sigma uniformity is approximately ±20%, more preferably ±15% and most preferably ±10% or better. Although the latter embodiment has been described using laser texture features, any type of method that produces a similar morphology, such as use of concentrated radiant energy, or other methods, such as by performing a patterning and etch step on the disk surface, achieves these advantages. However, any type of texture may be used in the CSS zone provided it is sufficiently rough to achieve the stiction performance described herein. Furthermore, as mentioned earlier, numerous types of textured sliders may be used. The embodiments described herein, as well as embodiments having such changes in form and detail come within the scope of the present invention.

What is claimed is:

1. An apparatus, comprising:

a disk; and a body in sliding contact with a contact surface of the disk during a portion of an operation of the disk, the body having a surface comprising a pattern of features having a first distance between the features, and wherein the disk comprises at least a first zone that includes the contact surface, the first zone having a roughness comprising a plurality of protrusions having a second distance between the protrusions, wherein the second distance between the protrusions is less than the first distance between the features.

2. The apparatus of claim 1, wherein at least one of the features is in sliding contact with at least one of the protrusion during the portion of the operation.

3. The apparatus of claim 1, wherein the features are pads.

4. The apparatus of claim 3, wherein the second distance between the protrusions is equal to or less than a size of the pads.

5. The apparatus of claim 1, wherein the disk further comprises a second zone that includes a data storage region, the second zone having a roughness lesser than the roughness of the first zone.

6. The apparatus of claim 1, wherein the disk further comprises a second of approximately 100 Angstroms or less.

7. The apparatus of claim 1, wherein the roughness is created by application of radiant energy.

8. The apparatus of claim 1, wherein the second distance between the protrusions is approximately 20 microns.

9. A method, comprising:

providing, on a body, a surface comprising a pattern of features having a first distance between the features, the body capable of sliding contact with a contact surface of a disk; and providing, on the disk, a roughness for at least a first zone by texturing the first zone to generate a plurality of protrusions having a second distance between the protrusions, wherein the second distance between the protrusions is less than the first distance between the features.

10. The method of claim 9, wherein providing the roughness further comprises generating the protrusions to have an average height of approximately 100 Angstroms or less.

11. The method of claim 9, wherein providing the roughness comprises applying pulsed laser energy to the disk.

* * * * *